United States Patent Office 2,716,565
Patented Aug. 30, 1955

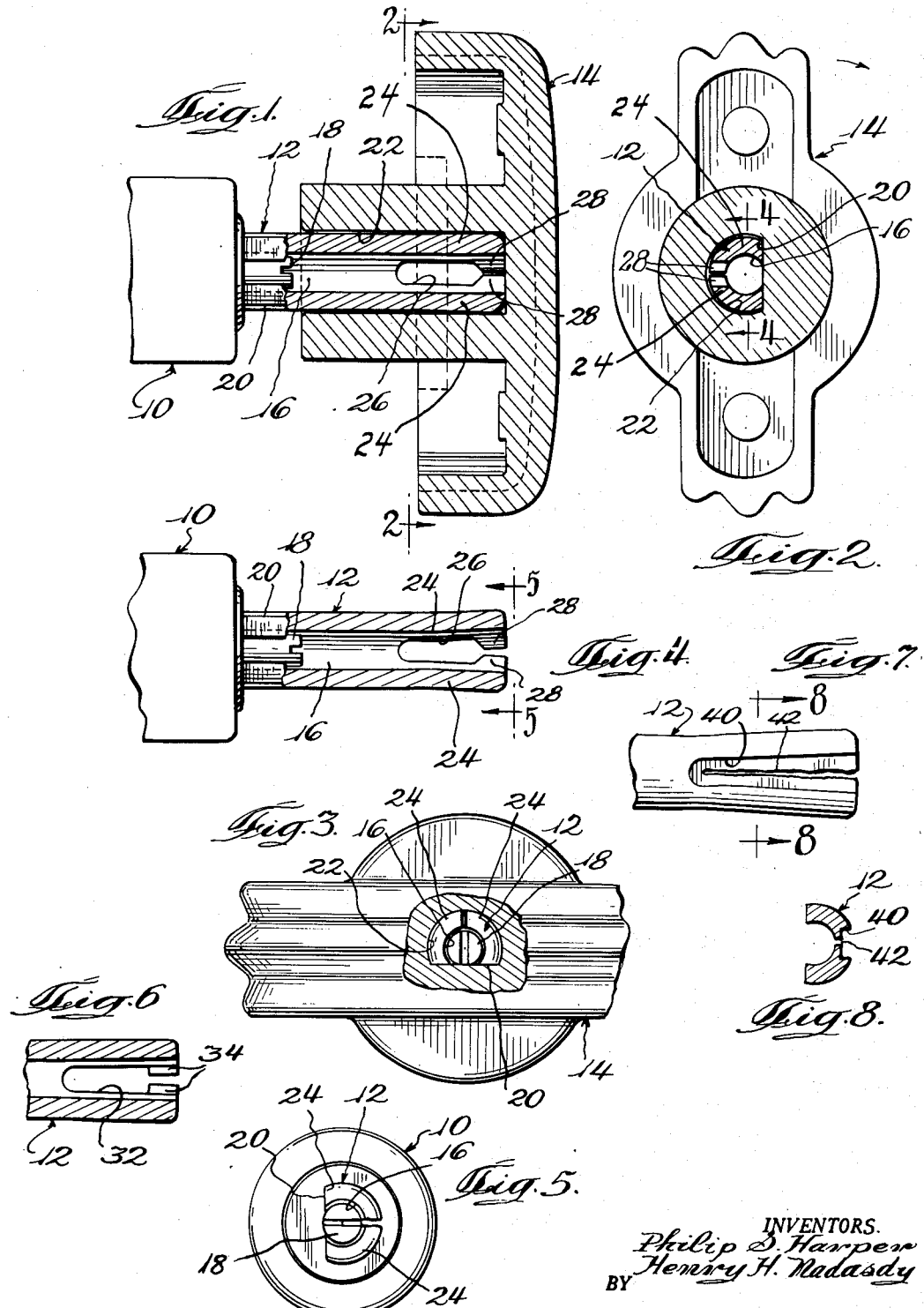

2,716,565

HANDLE FASTENING MEANS

Philip S. Harper and Henry H. Nadasdy, Chicago, Ill., assignors to Harper-Wyman Company, Chicago, Ill., a corporation of Illinois Application December 28, 1948, Serial No. 67,604

4 Claims. (Cl. 287—53)

The present invention relates to handle fastening means and has for its primary object the provision of a new and improved means for detachably securing a knob or handle to a shaft or stem and, more particularly, to the operating stem of a gas valve.

A further object of the present invention is the provision of a new and improved handle fastening means which is particularly suited for use with hollow valve operating stems.

Various types of fastening arrangements have been devised for securing handles and knobs to devices of many sorts. In so far as valve operating stems are concerned, fairly successful arrangements have been devised for use with solid valve stems but up to the time of the present invention these arrangements have not been altogether satisfactory for use with hollow valve stems used with valves having adjustable means within the valve plug for regulating the flow of gas in one position of the plug. The adjustable means within the plug can be reached and is adjusted through the hollow stem, generally after removal of the operating handle. When the stem is hollowed, considerable material is removed and this results in weakening of the stem. Consequently, arrangements which work satisfactorily with solid stems, which have more material, will not work satisfactorily with hollow stems. One such arrangement which can be used with solid stems, but which is not satisfactory for hollow stems, includes a stem slotted at its outer end to provide a pair of resilient spring fingers. These are spread apart somewhat so that when inserted into an associated socket in a valve handle, they frictionally engage and secure the handle to the stem.

The difficulty with the spring finger arrangement, especially in so far as hollow stems are concerned, is that it is relatively easy to move the fingers toward each other and to stress them beyond the elastic limit of the material of which they are made, whereby the normally resilient spread apart fingers are permanently moved so close together that the handle can no longer properly be secured to the stem. Such movement and excessive stressing of the fingers is likely to occur when a valve or stem is moved against stops determining its limit positions.

Accordingly, it is an object of the present invention to provide a new and improved arrangement for securing handles and knobs to various devices, such as valve stems, especially hollow valve stems, in which spring fingers are employed to hold the handle but in which the movement of the fingers is limited so they cannot be stressed beyond the elastic limit. As a result, the fingers are capable of satisfactorily holding the handle even though excessive turning force may be applied to the handle and stem.

Another object of the present invention is the provision of a new and improved handle fastening means comprising a valve stem having spread apart resilient holding elements at its end and structure limiting movement of said elements so that they can be moved but a limited distance toward each other and thus not stressed beyond the elastic limit of the material of which they are made.

The satisfactory operation of devices constructed in accordance with the present invention is not its only advantage. Another, and an important one, is that they can be constructed economically. So much so, in fact, that the construction can be advantageously used in connection with solid operating stems, as will be pointed out hereinafter.

Other objects and advantages of the present invention will become apparent from a description of illustrative embodiments thereof, in the course of which reference is had to the accompanying drawings, in which:

Fig. 1 is an enlarged axial cross sectional view through an operating stem and handle constructed in accordance with the present invention, the invention being shown in connection with a valve;

Fig. 2 is a transverse cross sectional view taken along the line 2—2 of Fig. 1;

Fig. 3 is an end elevation, partly broken away, of the handle and stem;

Fig. 4 is a fragmentary cross sectional view taken along the line 4—4 of Fig. 2, illustrating the stem only and the positions occupied by the resilient spring fingers prior to the placing of the handle thereon;

Fig. 5 is an end elevational view taken along the line 5—5 of Fig. 4;

Fig. 6 is a fragmentary view similar to Fig. 4 illustrating a modified construction;

Fig. 7 is a view similar to Fig. 6 of a further embodiment; and

Fig. 8 is a cross sectional view taken along the line 8—8 of Fig. 7.

Referring now to the drawing and first to Figs. 1 to 5, inclusive, it may be noted that the invention has been illustrated in connection with a valve 10 of which but a fragment has been illustrated. The valve has associated with it an operating stem 12 to which a manually operable handle or knob 14 is secured in accordance with the present invention. The valve stem is illustrated as being of the type having an axial passageway 16 for the reception of a screw-driver for the adjustment of "stem adjustment means" not shown except for a screw-headed adjustment member 18, which is adjustable for the purpose of regulating the flow of gas in a certain position of the valve. The adjustment means of the character specified may be of the type disclosed and claimed in the copending application of Philip S. Harper, Serial No. 576,673, filed February 7, 1945 (now Patent No. 2,590,535), and assigned to the assignee of this application.

The valve stem is preferably provided with a flat surface 20 at its outer or handle receiving end, giving that end a polygonal configuration of D-shape, thereby better nonrotatably to receive the handle 14 which has a complementary opening or socket 22 enabling it to be placed on the handle.

The handle fastening means of the present invention includes a pair of spring finger-like elements or fingers 24 of novel construction. An essential characteristic, and one which is common to the several embodiments of the invention illustrated and to be described hereinafter, is the construction of them with portions, which may be of considerable or limited axial length, adapted to engage each other to prevent movement of the spring fingers toward each other beyond their elastic limit, even though a considerable turning force be applied to the valve stem through the handle.

In the embodiment of the invention illustrated in Figs. 1 to 5, the spring fingers are made by removing, as by a punch press operation, a substantial quantity of material axially of the stem near its outer end. The removal is readily effected as by punching a slot 26 near the outer end of the valve stem. After the slot has been formed, the spring fingers are still united at their outer end. This union is disrupted, as by forcing a suitable tool into the slot thereby breaking the outer end of the valve stem to form two fingers 24. In thus breaking the outer end of the valve stem, there are provided two opposed projections 28, which, because of the fact that no material is removed during the separation and formation of the fingers, remain in contact until such time as the fingers are spread apart and thereafter serve to prevent the fingers from being moved so close to each other as to rob them of this resilience. As a final step in the operation, which may be performed simultaneously with the splitting, if desired, the fingers are spread apart in the manner illustrated in Fig. 4. When thus spread, the spring fingers remain separated so that when they are forced into the handle socket, they resiliently and frictionally secure the handle to the valve stem. It should be noted that the valve stem has a configuration, prior to spreading of the finger elements, corresponding to that of the socket. The socket, however, is preferably dimensioned to be slightly larger than the valve stem so that when the handle is placed on the stem, the portions 28 are brought quite close to but not into engagement with each other, as illustrated in Figs. 1, 2 and 3. This insures ease of assembly even though the stem and socket dimensions are somewhat outside their specified tolerance limits.

The construction of the stem with structure preventing movement of the spring fingers toward each other beyond a certain extent insures that the spring fingers cannot be moved toward each other to an extent beyond the elastic limit. If so moved, they would lose their effectiveness and would not satisfactorily hold the handle on the stem. However, the present invention makes it impossible so to move the spring fingers with the result that even when a great turning force is applied to the stem through the handle, the spring fingers will remain effective resiliently to hold the handle on the stem.

If desired, the structure for preventing the spring fingers from being moved toward each other beyond the elastic limit may be separate from but secured to the fingers. A construction of this character is illustrated in Fig. 6. In this embodiment of the invention, the outer end of the stem 12 is provided with a slot 32 of uniform width (prior to the fingers being spread apart) and extending inward from the outer end of the stem. Either before or after the thus formed spring fingers are spread apart, movement limiting structures 34 are secured to the spring fingers in opposed relationship. Alternatively, a single movement limiting structure or abutment having a combined width of the two elements 34 may be used.

Instead of removing the material by a punching or slotting operation, material can be removed as by milling a groove axially along one side, such as the outside of the stem. A construction of this character is illustrated in Figs. 7 and 8 wherein the outer side of the outer end of the valve stem 12 is shown with a milled groove 40. The groove is of sufficient depth to remove enough material to enable the outer end of the stem to be split or ruptured. The split can be effected by a suitable tool capable of spreading the outer end of the valve stem apart, thereby to split the end of the valve stem substantially centrally of the groove, as indicated by the reference character 42.

The present invention enables handles readily, economically and securely also to be fastened to solid stems of polygonal configuration. In doing this, a solid stem, say one of D-shaped configuration, is hollowed near its outer or handle receiving end as by a drilling operation. This makes the outer end generally similar to that of the hollow operating stems described above. After this has been done the stem can be completed as disclosed above and the handle can then be placed on the stem.

While the present invention has been illustrated in connection with the details of a number of illustrative embodiments, it should be understood that these details are not limitative of the invention except in so far as set forth in the accompanying claims. While the terms handle and knob have been used in description of the invention, only the former will be used in the claims but it should be understood to be used in a broad sense covering knobs as well as other manually operable elements by means of which an operating stem is moved. Also, by "spread apart" or "spreading apart" of the spring fingers is meant a spreading apart achieved by moving one or both fingers relative to the other.

Having thus described our invention, what we claim as new and desire to secure by Letters Patent of the United States is:

1. In combination, a valve operating handle having a D-shaped socket, and a rotatable valve stem of metal having some resilience and having an outer end portion inserted into said socket, said end portion of the stem being hollow, D-shaped and of a normal substantially uniform external size but slightly smaller than said socket so that the exterior of the stem engages the walls of the socket, the end portion of said stem being slotted axially in a generally radial plane to provide a pair of similar finger-like elements, and said finger-like elements having opposed integral rigid abutment portions normal to the axis of the stem and extending substantially into contact across the slot near the outer ends of said elements, said elements being sprung apart beyond the normal size of the stem prior to insertion of the stem into the handle socket to provide a resilient and frictional and readily detachable connection between the stem and the handle assembled thereon, and said abutment portions being substantially in contact upon insertion of the elements into the socket, thereby to prevent movement of said elements toward each other beyond a point whereat the stem dimension would be reduced substantially below its normal size upon application of excessive torque to said stem through the handle and thus to prevent the resilient holding action of said elements from being rendered ineffective.

2. In combination, a valve operating handle having a D-shaped socket, and a rotatable valve stem of metal having some resilience and having an outer end portion inserted into said socket, said end portion of the stem being hollow, D-shaped and of a normal substantially uniform external size but slightly smaller than said socket so that the exterior of the stem engages the walls of the socket, the end portion of said stem being slotted axially in a generally radial plane to provide a pair of similar finger-like elements, and said finger-like elements having opposed rigid abutment portions normal to the axis of the stem and the flat end extending substantially into contact across the slot near the outer ends of said elements, said elements being sprung apart beyond the normal size of the stem prior to insertion of the stem into the handle socket to provide a resilient and frictional and readily detachable connection between the stem and the handle assembled thereon, and said abutment portions being substantially in contact upon insertion of the elements into the socket, thereby to prevent movement of said elements toward each other beyond the point whereat the stem dimension would be reduced substantially below its normal size upon application of excessive torque to said stem through the handle and thus to prevent the resilient holding action of said elements from being rendered ineffective.

3. In combination, an operating handle having a socket of non-circular cross-section, and a rotatable stem of metal having some resilience and having an outer end portion inserted into said socket, said end portion of the stem having the same cross-sectional shape as the socket and a normal substantially uniform external size slightly smaller than said socket so that the exterior of the stem engages the walls of the socket, the end portion of said stem being slotted axially to provide a pair of finger-like elements, and rigid abutment structure in a plane substantially normal to the axis of the stem and secured to at least one of said finger-like elements and extending substantially into contact with the other element across the slot near the outer ends of said elements, said elements being sprung apart beyond the normal size of the stem prior to insertion of the stem into the handle socket to provide a resilient and frictional and readily detachable connection between the stem and the handle assembled thereon, and said abutment structure and elements being substantially in contact upon insertion of the elements into the socket, thereby to prevent movement of said elements toward each other beyond the elastic limit of the material comprising said stem and said elements in order to prevent destruction of the resilient holding action of said elements.

4. In combination, an operating handle having a socket of non-circular cross-section, and a rotatable stem of metal having some resilience and having an outer end portion inserted into said socket, said end portion of the stem having the same cross-sectional shape as the socket and a normal substantially uniform external size but slightly smaller than said socket so that the exterior of the stem engages the walls of the socket, the end portion of said stem being slotted axially to provide a pair of finger-like elements, and rigid abutment structure in a plane substantially normal to the axis of the stem and connected with at least one of said finger-like elements and extending substantially into contact with the other element across the slot near the outer ends of said elements, said elements being sprung apart beyond the normal size of the stem prior to insertion of the stem into the handle socket to provide a resilient and frictional and readily detachable connection between the stem and the handle assembled thereon, and said abutment structure and elements being substantially in contact across said slot upon insertion of the elements into the socket, thereby to prevent movement of said elements toward each other beyond the elastic limit of the material comprising the stem and the elements in order to prevent destruction of the resilient holding action of said elements.

References Cited in the file of this patent

UNITED STATES PATENTS

| | | |
|---|---|---|
| Re. 19,810 | Meusy | Jan. 7, 1936 |
| 1,998,649 | Arden | Apr. 23, 1935 |
| 2,015,918 | Brahant | Oct. 1, 1935 |
| 2,029,737 | Mueller | Feb. 4, 1936 |
| 2,067,976 | Mueller | Jan. 19, 1937 |
| 2,105,618 | Silva | Jan. 18, 1938 |
| 2,156,067 | Rubenstein | Apr. 25, 1939 |
| 2,191,294 | Turner | Feb. 20, 1940 |
| 2,210,993 | Weatherhead | Aug. 13, 1940 |
| 2,220,346 | Mueller | Nov. 5, 1940 |
| 2,296,058 | Rubenstein | Sept. 15, 1942 |

FOREIGN PATENTS

| | | |
|---|---|---|
| 465,364 | Great Britain | May 6, 1937 |
| 685,417 | Germany | Dec. 8, 1939 |